(12) United States Patent
Van Overmeere et al.

(10) Patent No.: US 11,667,795 B2
(45) Date of Patent: *Jun. 6, 2023

(54) COATING TO COOL A SURFACE BY PASSIVE RADIATIVE COOLING

(71) Applicant: Palo Alto Research Center Incorporated, Palo Alto, CA (US)

(72) Inventors: Quentin Van Overmeere, Mountain View, CA (US); Scott Alan Elrod, Palo Alto, CA (US); Scott E. Solberg, San Jose, CA (US); Gabriel Iftime, Dublin, CA (US); Ravi Neelakantan, Redwood City, CA (US); Bernard D. Casse, Saratoga, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/392,028

(22) Filed: Aug. 2, 2021

(65) Prior Publication Data
US 2021/0363356 A1 Nov. 25, 2021

Related U.S. Application Data

(60) Continuation of application No. 16/683,666, filed on Nov. 14, 2019, now Pat. No. 11,084,944, which is a
(Continued)

(51) Int. Cl.
*C08F 2/01* (2006.01)
*C08F 6/02* (2006.01)
(Continued)

(52) U.S. Cl.
CPC ............. *C09D 5/004* (2013.01); *C09D 5/024* (2013.01); *C09D 7/69* (2018.01); *C09D 129/14* (2013.01);
(Continued)

(58) Field of Classification Search
CPC ...... C09D 5/004; C09D 7/1283; C09D 5/024; C09D 2003/3045; C09D 129/14; C09D 133/10
See application file for complete search history.

(56) References Cited

U.S. PATENT DOCUMENTS

| 7,503,971 | B2 | 3/2009 | Wojtysiak |
| 10,584,250 | B2 * | 3/2020 | Van Overmeere ..... C09D 5/024 |

(Continued)

OTHER PUBLICATIONS

Raman, Aaswath P., et al. "Passive radiative cooling below ambient air temperature under direct sunlight." Nature 515.7528 (Nov. 2014): 540-544.
(Continued)

*Primary Examiner* — Robert D Harlan
(74) *Attorney, Agent, or Firm* — Womble Bond Dickinson (US) LLP (57) ABSTRACT

Disclosed herein in is a radiative cooling formulation including a first component with >55% reflectance in a wavelengths range of 0.3 to 2.5 microns, a second component with a first thermal emissivity peak value greater than 0.85 at a first wavelength in a range of 8 to 13 microns (μm), and a third component to mechanically bind together a mixture of the first component and second component.

14 Claims, 7 Drawing Sheets

Related U.S. Application Data continuation of application No. 16/403,285, filed on May 3, 2019, now Pat. No. 10,584,250, which is a division of application No. 15/444,029, filed on Feb. 27, 2017, now Pat. No. 10,323,151.

(51) Int. Cl.
| | |
|---|---|
| *C08F 6/10* | (2006.01) |
| *C08F 6/00* | (2006.01) |
| *B01J 8/18* | (2006.01) |
| *B01J 8/26* | (2006.01) |
| *C09D 5/33* | (2006.01) |
| *C09D 5/02* | (2006.01) |
| *C09D 133/10* | (2006.01) |
| *C09D 129/14* | (2006.01) |
| *C09D 7/40* | (2018.01) |
| *C08K 3/30* | (2006.01) |
| *C08K 3/22* | (2006.01) |

(52) U.S. Cl.
CPC .... *C09D 133/10* (2013.01); *C08K 2003/2241* (2013.01); *C08K 2003/3045* (2013.01); *C08K 2201/005* (2013.01)

(56) References Cited

U.S. PATENT DOCUMENTS

2016/0363394 A1\* 12/2016 Liu ........................ F28B 1/06
2016/0363396 A1    12/2016 Liu et al.

OTHER PUBLICATIONS

Chen, Zhen, et al. "Radiative cooling to deep sub-freezing temperatures through a 24-h day-night cycle." Nature Communications 7 (Dec. 13, 2016).

Gentle, Angus R., and Geoff B. Smith. "A subambient open roof surface under the Mid-Summer sun." Advanced Science 2.9 (May 26, 2015).

\* cited by examiner

Graph 400

FIG. 4A

Graph 420

COATING TO COOL A SURFACE BY PASSIVE RADIATIVE COOLING

RELATED APPLICATIONS

The present application is a continuation of U.S. patent application Ser. No. 16/683,666, filed Nov. 14, 2019, which is a continuation of U.S. patent application Ser. No. 16/403,285, filed May 3, 2019, now issued as U.S. Pat. No. 10,584,250 on Mar. 10, 2020, which is a divisional of U.S. patent application Ser. No. 15/444,029, filed Feb. 27, 2017, now issued as U.S. Pat. No. 10,323,151 on Jun. 18, 2019, the entire contents of which are hereby incorporated by reference.

STATEMENT REGARDING FEDERALLY SPONSORED RESEARCH AND DEVELOPMENT

This invention was made with Government support under Contract No. DE-AR0000583ARPAE-ARID-MetaCool awarded by the Advanced Research Projects Agency-Energy. The Government has certain rights in this invention.

TECHNICAL FIELD

The presently disclosed implementations are directed to a coating, and, more particularly, to a coating to cool a surface by passive radiative cooling.

BACKGROUND

Cooling can be achieved by active cooling or passive cooling. Active cooling involves the consumption of energy to cool an object (e.g., paying for external energy), whereas passive cooling requires no energy from an external source to cool an object (e.g., natural, no-cost energy transfer). Radiative cooling is the process by which an object loses heat by thermal radiation (e.g., electromagnetic radiation generated by thermal motion of charged particles in matter). Passive radiative cooling refers to losing heat by thermal radiation to an external thermal sink, without the consumption of energy. A subset of passive cooling systems operate even when the objects to be cooled are exposed to sunlight. Such daylight passive radiative cooling materials include for example multilayer inorganic films, coating formulations including glass microspheres, and multilayer polymer films with a silver reflector.

SUMMARY

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to some aspects of the present disclosure, there is provided a radiative cooling formulation including a binder comprising a plurality of polymers including a first polymer and a second polymer that are practically water insoluble and are substantially non-absorbing to light having wavelengths in a solar spectrum. The first polymer has a first emissivity peak value greater than 0.85 at a first wavelength between 4 and 35 micrometers (μm) and the second polymer has a second emissivity peak value greater than 0.85 at wavelengths between 4 and 35 μm. The first emissivity peak value and the second emissivity peak value are substantially non-overlapping. A net emissivity of the first polymer and the second polymer is greater than at least one of first emissivity of the first polymer or second emissivity of the second polymer. The radiative cooling formulation further includes a solar reflector material embedded in the binder.

In certain implementations, each of the plurality of polymers has a corresponding emissivity peak value greater than 0.85 at wavelengths between 4 and 35 μm and each of the corresponding emissivity peak values are substantially non-overlapping.

In certain implementations, the first wavelength and second wavelength are between 8 and 13 μm.

In certain implementations, the solar reflector material reflects solar radiation at wavelengths from 0.3 to 2.5 μm and has an average solar reflectance greater than 0.95.

In certain implementations, the solar reflector material comprises particles of barium sulfate ($BaSO_4$) and at least half of the particles of $BaSO_4$ are smaller than 2 μm.

In certain implementations, the radiative cooling formulation further comprises titanium dioxide ($TiO_2$) embedded in the binder.

In certain implementations, each of the plurality of polymers is selected from the group consisting of ethyl cellulose, poly ethyl methacrylate (PEMA), poly methyl methacrylate (PMMA), polyvinyl butyral (PVB), cellulose acetate, polyethylene, polypropylene, polyethylene terephthalate (PET), polyethylene naphthalate (PEN), polyesters, and polycarbonates, wherein the first polymer is different from the second polymer.

In certain implementations, the binder is a polymer emulsion comprising at least one of a first set of particles comprising the first polymer or a second set of particles comprising the second polymer.

According to other aspects of the present disclosure, there is provided an apparatus including a substrate and a coating on the substrate. The coating includes a binder including a plurality of polymers including a first polymer and a second polymer that are practically water insoluble and are substantially non-absorbing to light having wavelengths in a solar spectrum. The first polymer has a first emissivity peak value greater than 0.85 at first wavelength between 4 and 35 μm and the second polymer has a second emissivity peak value greater than 0.85 at a second wavelength between 4 and 35 μm, the first emissivity peak value and the second emissivity peak value are substantially non-overlapping, and a net emissivity of the first polymer and the second polymer is greater than at least one of first emissivity of the first polymer or second emissivity of the second polymer. The coating further includes a solar reflector material embedded in the binder.

In certain implementations, each of the plurality of polymers has a corresponding emissivity peak value greater than 0.85 at wavelengths between 4 and 35 μm and each of the corresponding emissivity peak values are substantially non-overlapping.

In certain implementations, the first wavelength and second wavelength are between 8 and 13 μm.

In certain implementations, thickness of the coating is at least 70 μm.

In certain implementations, the apparatus further includes a layer on the coating, the layer including one or more of polytetrafluoroethylene (PTFE), perfluoroalkoxy polymer (PFA), fluorinated ethylene-propylene (FEP), ethylene tetrafluoroethylene (ETFE), or tetrafluoroethylene/hexafluoropropylene/vinylidene fluoride copolymer (THV).

In certain implementations, the apparatus further includes a layer including a hydrophobic material, the layer being on the coating. The hydrophobic material is substantially non-absorbing of wavelengths from 0.3 to 2.5 µm and the hydrophobic material includes at least one of fluorinated silica nanospheres or nano-etched silica.

In certain implementations, the apparatus further includes a layer including $TiO_2$, the layer being on the coating.

In certain implementations, the coating provides passive radiative cooling greater than zero Watts per square meter ($W/m^2$) without input of water or electricity.

In certain implementations, the coating provides passive radiative cooling of at least 5 degrees Celsius below ambient temperature when solar illumination is present and without input of water or electricity.

In certain implementations, the substrate comprises at least one of aluminum, steel, galvanized steel, carbon fiber resin, a tent, a flexible tarp, a roof structure, or a surface of an automobile.

According to other aspects of the present disclosure, there is provided a method comprising applying a coating of a radiative cooling formulation to an object. The radiative cooling formulation includes a binder including a plurality of polymers including a first polymer and a second polymer that are practically water insoluble and are substantially non-absorbing to light having wavelengths in a solar spectrum. The first polymer has a first emissivity peak value greater than 0.85 at a first wavelength between 4 and 35 µm and the second polymer has a second emissivity peak value greater than 0.85 at wavelengths between 4 and 35 µm. The first emissivity peak value and the second emissivity peak value are substantially non-overlapping. A net emissivity of the first polymer and the second polymer is greater than at least one of first emissivity of the first polymer or second emissivity of the second polymer. The radiative cooling formulation further includes a solar reflector material embedded in the binder.

In certain implementations, each of the plurality of polymers has a corresponding emissivity peak value greater than 0.85 at wavelengths between 4 and 35 µm and each of the corresponding emissivity peak values are substantially non-overlapping.

In certain implementations, the first wavelength and second wavelength are between 8 and 13 µm.

In certain implementations, the method further includes applying a layer on the coating, the layer including one or more of PTFE, PFA, FEP, ETFE, or THV.

In certain implementations, the method further includes applying a layer on the coating, the layer including a hydrophobic material, where the hydrophobic material is substantially non-absorbing of wavelengths from 0.3 to 2.5 µm.

In certain implementations, the method further includes applying a layer on the coating, the layer including $TiO_2$.

In certain implementations, the object includes at least one of aluminum, steel, galvanized steel, carbon fiber resin, a tent, a flexible tarp, a roof structure, or a surface of an automobile.

BRIEF DESCRIPTION OF THE DRAWINGS

The present disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Described herein are implementations of a radiative cooling formulation (e.g., a passive radiative cooling formulation, a radiative cooling paint, a radiative cooling coating, etc.), an apparatus including a substrate coated with a radiative cooling formulation, and methods of applying a radiative cooling formulation to an object. In certain implementations, the radiative cooling formulation can be used to achieve cooling (e.g., from 0 (equilibrium, e.g., at 8° C. below ambient) or greater than 0 to about 400 W/m$^2$, depending on air and substrate temperature) without any input of water or electricity. The radiative cooling formulation can achieve cooling of up to about 10 degrees Celsius (° C.) below ambient temperature during daytime. In certain implementations, the radiative cooling formulation is low cost (e.g., does not rely on lithography or multilayer dielectric thin films) and is scalable (e.g., a 100-500 μm-thick coating can be applied by brushing, spraying, rolling, dipping, doctor blading a paint, or other painting technologies).

FIGS. 1A-D illustrate an apparatus 100 including a coating 120 of a radiative cooling formulation on a substrate 110, in accordance with implementations of the present disclosure.

The substrate 110 may include one or more of metal, ceramic, plastic, composite, stationary parts, moving parts, etc. For example, the substrate 110 may include aluminum, steel, galvanized steel, carbon fiber resin, a roof tent, a flexible tarp, an upper layer of a roof structure, an outer surface of an automobile, an interior surface (e.g., cabin surface) of an automobile, etc. The substrate 110 may be used in building applications, power plant cooling, cooling water in pipes (dissipate heat from the water to the sky 108 so that $T_{out}$ of the water is less than $T_{in}$ of the water), tents, umbrellas, blankets, etc.

In some implementations, the substrate 110 is a roof and the coating 120 is applied to the roof to cool the roof (e.g., a "cool roof" technology, the coating 120 is a cool roof coating, a "cool roof" is a roof that has been designed to reflect more sunlight and absorb less heat than a standard roof). The coating 120 (e.g., cool roof coating) may have a pigment (e.g., a white pigment, a reflective pigment) that reflects sunlight. The coating 120 may protect the substrate 110 (e.g., roof surface) from ultraviolet (UV) light and chemical damage and may offer water protection and restorative features.

The coating 120 is a radiative cooling formulation that is applied to the substrate 110 in one single layer. The radiative cooling formulation may be applied to the substrate 110 in the form of paint (e.g., sprayed, brushed, rolled, dipped, doctor bladed, etc.) to form the coating 120. In some implementations, the coating 120 is ultra-white. The radiative cooling formulation provides solar reflectance and infrared emissivity in one single layer that can be sprayed on as coating 120. The radiative cooling formulation includes a binder and a solar reflector material (e.g., solar reflector particles) embedded in the binder (e.g., the binder binds solar reflector material together).

The coating 120 can either be a broadband thermal emitter (i.e. provides thermal emission at all wavelengths >4 μm) or a selective emitter (e.g., emits thermal radiation in the atmospheric transparency window (e.g., 8-13 μm)). In both cases, the coating 120 cools down by emitting more thermal energy (thermal emission 106, power radiated 206 of FIG. 2A) to its surroundings (e.g., sky (cold sink) 108) than the thermal energy (thermal emission 107, power absorbed 202 of FIG. 2A) that the coating 102 absorbs from the sky 108 (e.g., the sky 108 is a cold sink). A broadband thermal emitter may maximize the cooling power and may achieve a temperature of about 10° C. below ambient temperature. A selective emitter may maximize the temperature difference relative to ambient air temperature and may achieve a temperature of about 60° C. below ambient (e.g., temperature difference may depend on amount of energy loss due to convection, conduction and radiation). Selective emission may not be needed when the temperature of the coating 120 is more than 10° C. below ambient temperature and selective emission may be needed when the temperature of the coating 120 is less than 10° C. below ambient temperature.

The binder includes two or more polymers (e.g., a first polymer and a second polymer). In certain implementations, the two or more polymers are practically water insoluble (e.g., once dried or cured are practically not soluble in water, about greater than 10,000 mL water is needed to dissolve 1 g of the two or more polymers that are practically water insoluble). In certain implementations, the two or more polymers are water insoluble.

Figure 1A:
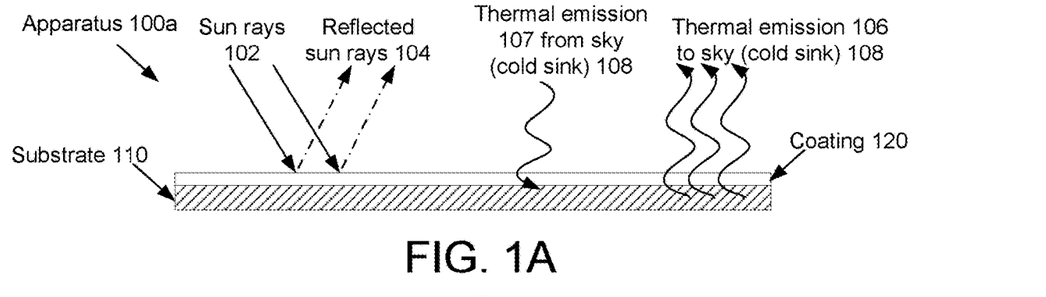
FIG. 1A illustrates an apparatus including a coating of a radiative cooling formulation on a substrate, in accordance with implementations of the present disclosure.

The two or more polymers are substantially non-absorbing (e.g., solar absorbance of the polymers is less than 0.7 when the coating 120 has a thickness of at least 1 millimeter (mm)) to light having wavelengths in a solar spectrum (e.g., 200-4000 nanometers (nm), 400-700 nm, 450-650 nm, etc.). In certain implementations, the two or more polymers have emissivity peak values greater than 0.85 at wavelengths between 4 and 35 μm. In certain implementations, the two or more polymers have emissivity peak values greater than 0.85 at wavelengths between 8 and 13 μm. Two or more of the emissivity peak values are substantially non-overlapping (e.g., a first emissivity peak value of a first polymer is at a first wavelength and a second emissivity peak value of a second polymer is at a second wavelength which is substantially different from the first wavelength). A net emissivity of the two or more polymers is greater than emissivity of any one of the two or more polymers alone (e.g., increases the aggregate emissivity in the range of 4-35 μm, a net emissivity of the first polymer and the second polymer at a third wavelength between 4 and 35 μm is greater than emissivity of either of the first polymer or the second polymer alone at the third wavelength).

In certain implementations, the two or more polymers are two or more of ethyl cellulose, poly ethyl methacrylate (PEMA), poly methyl methacrylate (PMMA), polyvinyl butyral (PVB), cellulose acetate, polyethylene, polypropylene, polyethylene terephthalate (PET), polyethylene naphthalate (PEN), polyesters, and polycarbonates, where a first polymer of the two or more polymers is different from a second polymer of the two or more polymers. The two or more polymers may also incorporate ultraviolet absorbers additives that absorb UV radiation (e.g., wavelengths ≤400 nm). Ultraviolet absorbers suitable for the present invention include hydroxybenzophenone and hydroxyphenylbenzotriazole, titanium dioxide, benzotriazoles and hydroxyphenyltriazines.

In certain implementations, the binder in the coating 120 has a high spectral emittance (e.g., emissivity peaks) at wavelengths where infrared radiation occurs for a blackbody at a temperature near 300 Kelvin (K) (e.g., wavelengths of 4 to 35 µm). In certain implementations, the binder in the coating 120 has a high spectral emittance (e.g., emissivity peaks) at wavelengths for which the atmosphere is transparent (8 to 13 µm). This results in an imbalance between thermal radiation emitted by the sample, and that emitted by the atmosphere and absorbed by the binder in the coating 120. The imbalance provides a net cooling of the binder, coating 120, substrate 110, and apparatus 100.

The coating 120 reflects sun rays 102 (e.g., wavelengths in the solar spectrum, wavelengths of 0.3 to 2.5 µm) to produce reflected sun rays 104. In certain implementations, the sun rays 102 are scattered by the two or more polymers of the binder. In certain implementations, the sun rays 102 are propagated through the two or more polymers and scattered by the solar reflector material. In certain implementations, a first portion of the sun rays 102 are scattered by the two or more polymers and a second portion of the sun rays 102 are propagated through the two or more polymers and scattered by the solar reflector material, leading to a solar reflectance of coating 120 that is higher than 0.95.

In some implementations, the solar reflector material reflects wavelengths in the solar spectrum (e.g., sun rays 102). The solar reflector material may reflect solar radiation (wavelengths of 0.3 to 2.5 µm) with an average solar reflectance that is higher than 0.95. The heat input due to absorbed solar radiation is less than the heat loss due to emitted thermal radiation thus resulting in a net heat loss for the coated object. For example, for a typical solar illumination of 900 W/m², a solar reflectance of the coating 120 equal to 0.95 results in heating of the object at a power density of 45 W/m². The net cooling power from thermal emission (thermal radiation power density emitted by the apparatus 100 minus thermal radiation power density absorbed from the atmosphere at a surface temperature, and an ambient air temperature of 30° C.) is about 100 W/m². In this case, the apparatus temperature is reduced due to the imbalance (e.g., net power into the object is 45 W/m²–100 W/m²=–55 W/m²).

In certain implementations, the solar reflector material is a pigment that can be used in paint. In certain implementations, the solar reflector material includes particles of barium sulfate ($BaSO_4$, barite, blanc fixe). Using $BaSO_4$ in the coating 120 may provide a solar reflectance of the coating 120 of up to 97%. $BaSO_4$ has high spectral emissivity at 8.4, 8.9, and 9.3 µm, and so contributes to infrared radiation (IR) emission in the atmospheric transparency window. In one implementation, at least half of the particles of $BaSO_4$ are smaller than 2 µm. In one implementation, at least half of the particles of $BaSO_4$ are no larger than 5 µm. In one implementation, at least half of the particles of $BaSO_4$ are not smaller than 0.2 µm. In another implementation, at least half of the particles of $BaSO_4$ are not smaller than 0.1 µm. In one implementation, the particles of $BaSO_4$ have a mean particle size (volume) distribution (D50(volume)) from about 0.1 to about 5 µm. In one implementation, the particles of $BaSO_4$ have a D50(volume) from about 0.2 to about 2 µm. In one implementation, 0.0% of the particles of $BaSO_4$ fall below 0.1 µm. In one implementation, 0.0% of the particles of $BaSO_4$ are above 5 µm.

The solar reflector material particles may have a distribution of sizes and morphologies (e.g., related to the method of manufacture). In one implementation, the solar reflector material includes one or more of spherical particles, flake particles, or elongated particles. In another implementation, the solar reflector material comprises particles of polytetrafluoroethylene (PTFE). In another implementation, the solar reflector material comprises one or more of $BaSO_4$, PTFE, zinc oxide (ZnO), aluminum oxide ($Al_2O_3$, alumina), magnesium oxide (MgO, magnesia).

Figure 1B:
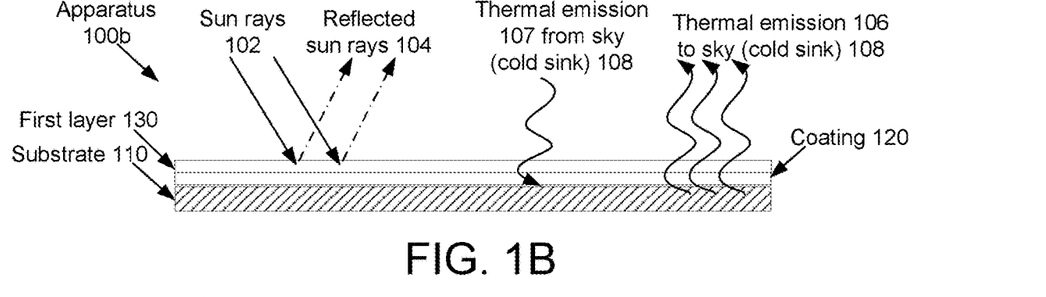
FIG. 1B illustrates an apparatus including the coating on the substrate and a first layer on the coating, in accordance with implementations of the present disclosure.
Figure 1C:
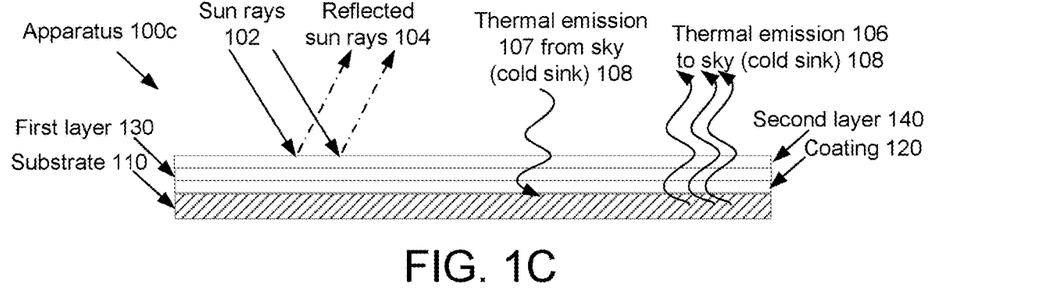
FIG. 1C illustrates an apparatus including the coating on the substrate and the first layer and a second layer on the coating, in accordance with implementations of the present disclosure.
Figure 1D:
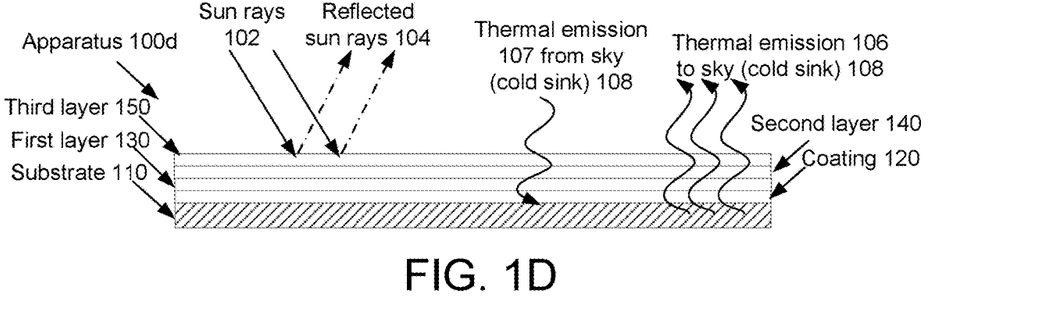
FIG. 1D illustrates an apparatus including the coating on the substrate and the first layer, the second layer, and the third layer on the coating, in accordance with implementations of the present disclosure.

In certain implementations, the coating 120 of radiative cooling formulation further includes titanium dioxide ($TiO_2$) embedded in the binder. In certain implementations, the $TiO_2$ is a layer (e.g., first layer 130, second layer 140, third layer 150) on the coating 120. The $TiO_2$ may perform photocatalytic degradation of particles, gases, and pollutants that would otherwise result in increased solar absorbance and decreased solar reflectance.

In some implementations, the radiative cooling formulation includes less than about 1% by volume of $TiO_2$, about 70 to 94% by volume of $BaSO_4$, and about 6-30% by volume binders. In some implementations, the radiative cooling formulation includes a solvent that dissolves the two or more polymers. The solvent would be selected not just based on its solvent strength, but also based on its safety, boiling and flash points, and price. Examples include one or more of ethyl alcohol, butyl Carbitol™, Carbitol™, dimethylformamide, xylene, toluene, mineral spirits (e.g. mixture of aliphatic carbons), methylethyl ketone, methyl isobutyl ketone, butyl acetate, 1-methoxy-2-propylacetate, etc. In some implementations, the binder is in the form of an emulsion and water may be used as the liquid carrier.

In some implementations, the binder of the radiative cooling formulation includes a polymer emulsion including at least one of a first set of particles including the first polymer or a second set of particles including the second polymer. The binder may be a dispersion of one or more polymers in a solvent (e.g., water) in which the one or more polymers are not soluble or miscible. The binder (e.g., a polymer material) may be a water emulsion (e.g., incorporated as a water emulsion instead of as dissolved in an organic solvent). A binder that is a polymer emulsion may be used in environments requiring low volatile organic content (VOC) coating materials. In some implementations, the radiative cooling formulation includes a dispersion of particles (e.g., polymer binders, $TiO_2$, $BaSO_4$, dispersant, etc.) in water. In some implementations, radiative cooling formulation includes about 6-30% by volume of polymer binders in the form of nanoparticles, less than about 1% by volume of $TiO_2$, about 70 to 94% by volume of $BaSO_4$, and less than 5% by volume of dispersant. The emulsion may include dispersant stabilized polymer particles having a particle size from about 10 nm to 500 nm dispersed in water.

In some implementations, the polymer particle emulsion is prepared by dissolving the one or more polymers in an organic solvent by mixing the one or more polymers in the organic solvent with a mechanical stirrer and heating as necessary to obtain a homogeneous polymer solution. Any solvent that dissolves the one or more polymers and that is either not miscible or has relatively limited miscibility with water is suitable for the purpose of fabrication of the emulsion. About 10% by volume of $NH_4OH$ is added to the polymer solution mixture drop-wise (e.g., drop by drop, dripping the $NH_4OH$ into the polymer solution) and the mixture is stirred for up to 15 minutes. De-ionized water (e.g., about 3-5 times more deionized water than the volume of organic solvents) is slowly mixed with a pipette or with a pump for at least 1-5 hours. The mixture is poured into a glass pan, which is maintained in a fume hood overnight and is stirred by a magnetic stir-bar so that the solvent can evaporate off. Alternatively, the solvent can be removed by a conventional distillation process.

In some implementations, the coating 120 of radiative cooling formulation further includes a hydrophobic material as a layer (e.g., first layer 130, second layer 140, third layer 150) on the coating 120. Apparatus 100 may become dirty and accumulate dust, dirt, and debris over time which degrades the solar reflectance (e.g., a cool roof technology may drop 5 to 23% in solar reflectance over 3 years). Apparatus 100 must be cleaned and kept free of dust, dirt, and debris to maintain a high reflectance. The hydrophobic material (e.g., in or on the coating 120) allows the apparatus 100 to be kept clean and free of dust/debris to maintain a high reflectance over time (e.g., allows washing of the apparatus 100, prevents liquid accumulation, repels water, repels ice, etc.). The hydrophobic material is substantially non-absorbing of wavelengths from 0.3 to 2.5 μm. In some implementations, the hydrophobic material includes fluorinated silica nanospheres. In some implementations, the hydrophobic material includes nano-etched silica.

In one implementation, the coating 120 has a thickness of at least 70 μm.

In certain implementations, the coating 120 provides passive radiative cooling of 50 to 100 W/m$^2$ when cooling a surface at 30 degrees C. at an ambient air temperature of 30 degrees C., without input of fluids such as water, air, or refrigerant, or electrical or mechanical energy. In certain implementations, the coating provides passive radiative cooling of up to about 10° C. below ambient when solar illumination is present and without input of water or electricity (e.g., at noon in September in Palo Alto, Calif., for an ambient temperature of about 30° C.). In certain implementations, a tent with coating 120 on an upper surface of the tent is up to about 11° C. cooler than an uncoated tent (e.g., in August and September) (e.g., tent surface temperature, temperature inside the tent, etc.). The coating 120 provides the passive radiative cooling when the coating is exposed to the sky at normal incidence and at an angle. The coating 120 provides the passive radiative cooling when not exposed to the sun and when exposed to the sun.

FIG. 1A illustrates an apparatus 100a including a coating 120 of a radiative cooling formulation on a substrate 110, in accordance with implementations of the present disclosure.

FIGS. 1B-D illustrate an apparatus 100 including one or more layers on the coating 120. In certain implementations, the one or more layers provide one or more of resistance to abrasion, ultraviolet radiation, water, or inorganic pollutants. The coating 120 with or without the one or more layers spontaneously cools down below ambient temperature when exposed to the sky, even when solar illumination is present.

FIG. 1B illustrates an apparatus 100b including a coating 120 of a radiative cooling formulation on a substrate 110 and a first layer 130 on the coating, in accordance with implementations of the present disclosure. In some implementations, the first layer 130 comprises one or more of a hydrophobic material, TiO$_2$, or a fluoropolymer (e.g., PTFE, PFA, FEP, ETFE, THV, etc.). The fluoropolymer may be substantially non-absorbing of wavelengths from 0.3 to 2.5 μm (e.g., the fluoropolymer may have measureable, yet insignificant absorption in part of this wavelength range). In some implementations, a layer of fluoropolymer includes ETFE and the ETFE may be a Tefzel™ cover sheet that protects the coating 120 from environmental degradation. ETFE is hydrophobic and is transmissive to solar radiation (e.g., ETFE decreases solar reflectance by about 0.28%, ETFE is substantially non-absorbing of sunlight). In some implementations, the layer 130 includes components for resistance to one or more of abrasion (e.g., an anti-abrasion layer that protects coating 120 from degradation by sand or other particles), UV radiation, water, dust, or dirt.

FIG. 1C illustrates an apparatus 100c including a coating 120 of a radiative cooling formulation on a substrate 110, a first layer 130 on the coating 120, and a second layer 140 on the first layer 130, in accordance with implementations of the present disclosure. In some implementations, the first layer 130 is one or more of a hydrophobic material or TiO$_2$. In some implementations, the second layer 140 is an hydrophobic material, TiO$_2$, or a fluoropolymer (e.g., a Tefzel™ cover sheet).

FIG. 1D illustrates an apparatus 100d including a coating 120 of a radiative cooling formulation on a substrate 110, a first layer 130 on the coating 120, a second layer 140 on the first layer 130, and a third layer 150 on the second layer 140, in accordance with implementations of the present disclosure. In some implementations, the first layer 130 is an hydrophobic material and the second layer 140 is TiO$_2$. In some implementations, the first layer is TiO$_2$ and the second layer 140 is an hydrophobic material. In some implementations, the third layer 150 is a fluoropolymer (e.g., a Tefzel™ cover sheet). One or more of the first layer 130, the second layer 140, or the third layer 150 may be substantially non-absorbing of wavelengths from 0.3 to 2.5 μm (e.g., the one or more layers may have measureable, yet insignificant absorption in part of this wavelength range).

Figure 2A:
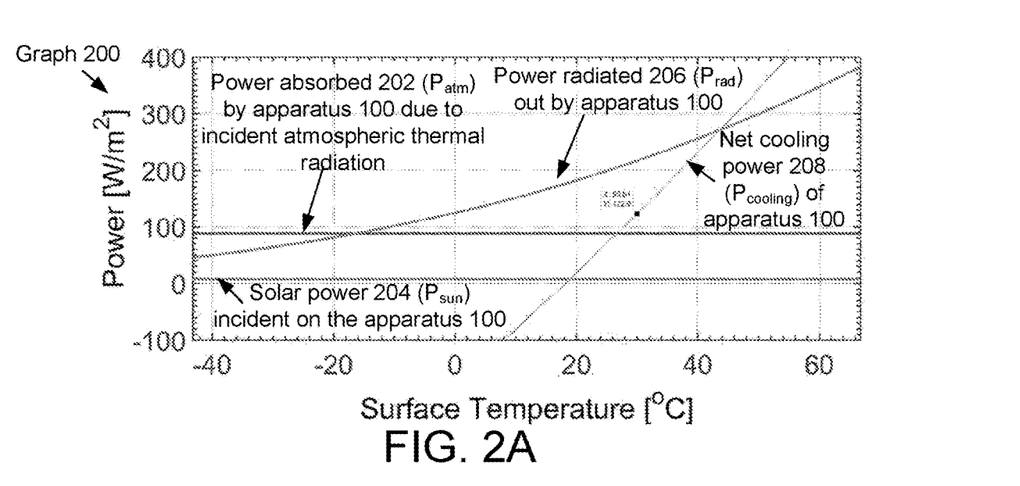
FIG. 2A is a graph illustrating power absorbed by an apparatus with a coating of a radiative cooling formulation, power radiated by the apparatus, solar power incident on the apparatus, and net cooling power of the apparatus at different surface temperatures, in accordance with implementations of the present disclosure.

FIG. 2A is a graph 200 illustrating power absorbed 202 ($P_{atm}$) by an apparatus 100 with a coating 120 of a radiative cooling formulation due to incident atmospheric thermal radiation, power radiated 206 ($P_{rad}$) by the apparatus 100, solar power 204 ($P_{sun}$) incident on the apparatus 100, and net cooling power 208 ($P_{cooling}$) of the apparatus 100 at surface temperatures, in accordance with implementations of the present disclosure.

The net cooling power 208 ($P_{cooling}$) of the apparatus 100 with a coating 120 of a radiative cooling formulation may be calculated using equations (1)-(6).

$$P_{cooling} = P_{rad} - P_{atm} - P_{sun} \pm P_{con} \quad (1)$$

$P_{cooling}$ is the net cooling power 208. $P_{rad}$ is the power radiated 206 out by the apparatus 100. $P_{atm}$ is the power absorbed 202 due to incident atmospheric thermal radiation (e.g., at ambient air temperature 222). $P_{sun}$ is the solar power 204 incident on apparatus 100. $P_{con}$ is the power lost or gained due to convection and conduction. Power radiated 206 may be calculated using equation (2).

$$P_{rad}(T) = \int d\Omega \cos\theta \int_0^\infty d\lambda I_{BB}(T,\lambda)\varepsilon(\lambda,\theta) \quad (2)$$

T is the temperature of the apparatus 100. The integral of $d\Omega$ is the angular integral over a hemisphere. The integral of $I_{BB}(T,\lambda)$ is the integral of the spectral radiance of a blackbody at temperature T. $\varepsilon(\lambda,\theta)$ is the spectral and angular emissivity.

Power absorbed 202 may be calculated using equation (3).

$$P_{atm}(T_{atm}) = \int d\Omega \cos\theta \int_0^\infty d\lambda I_{BB}(T_{atm},\lambda)\varepsilon(\lambda,\theta)\varepsilon_{atm}(\lambda,\theta) \quad (3)$$

$T_{atm}$ is the atmospheric temperature. $\varepsilon_{atm}(\lambda,\theta)$ is spectral and angular emissivity due to incident atmospheric thermal radiation and may be calculated using equation (4).

$$\varepsilon_{atm}(\lambda,\theta)=1-t(\lambda)^{1/\cos\theta} \quad (4)$$

$t(\lambda)$ is the atmospheric transmittance in the zenith direction.

Solar power 204 may be calculated using equation (5).

$$P_{sun}=\int_0^\infty d\lambda I_{AM1.5}(\lambda)\varepsilon(\lambda,0) \quad (5)$$

$P_{sun}$ is the incident solar power absorbed by the apparatus 100. $I_{AM1.5}$ is the solar illumination in the AM1.5 spectrum. $\varepsilon(\lambda,0)$ is emissivity of the apparatus 100 at a fixed angle (e.g., angle the apparatus 100 is facing the sun).

Power lost or gained due to convection and conduction may be calculated using equation (6).

$$P_{con}(T,T_{amb})=h_c(T_{amb}-T) \quad (6)$$

$P_{con}$ is the power due to convection and conduction. $h_c$ is a combined non-radiative heat coefficient that captures the collective effect of conductive and convective heating owing to the contact of the apparatus 100 with external surfaces (conduction) and air adjacent to the apparatus 100 (convection).

Returning to FIG. 2A, in some implementations, the $P_{cooling}$ 208 of an apparatus 100 with a coating 120 of a radiative cooling can be calculated by $P_{rad}$ 206 minus $P_{atm}$ 202 minus $P_{sun}$ 204. For example, $P_{cooling}$ 208 of apparatus 100 with a surface temperature of 8° C. is about −100 W/m², at 20° C. is about 0 W/m², at 26° C. is about 100 W/m², at 30° C. is about 123 W/m², at 40° C. is about 240 W/m², at 50° C. is about 350 W/m², at 54° C. is about 400 W/m². $P_{cooling}$ 208 may be at least 100 W/m² when the surface temperature of the apparatus 100 is at or above 28° C.

Figure 2B:
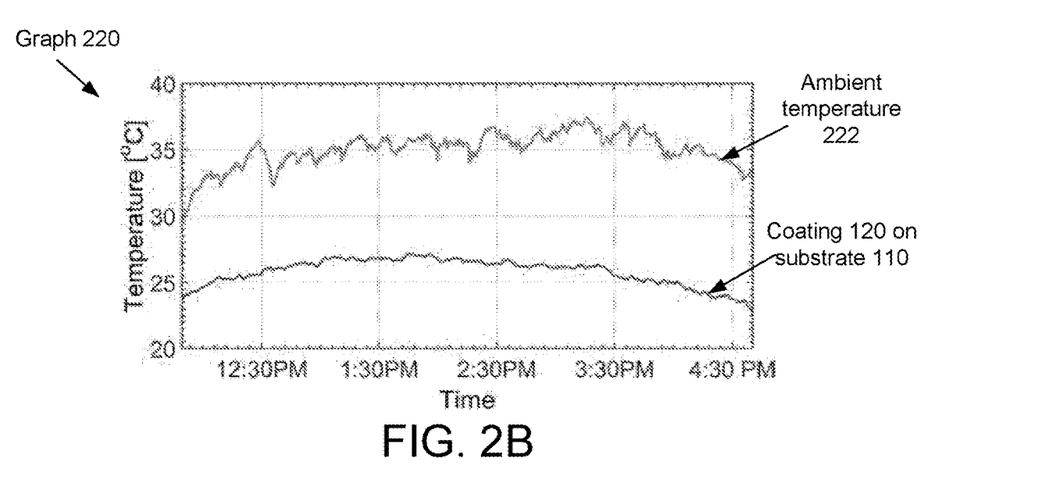
FIG. 2B is a graph illustrating ambient temperature and temperature of a substrate coated with a radiative cooling formulation at different times of day, in accordance with implementations of the present disclosure.

FIG. 2B is a graph 220 illustrating ambient temperature 222 and temperature of an apparatus 100 including a coating 120 of a radiative cooling formulation on a substrate 110 at different times of day, in accordance with implementations of the present disclosure. The temperature of the apparatus 100 is about 8-9° C. lower than ambient temperature 222.

FIGS. 3A-E are graphs illustrating linear regression of change of temperature of cool roof paint 310 and linear regression of change of temperature of a coating 120 of a radiative cooling formulation at different parameters, in accordance with implementations of the present disclosure. The performance of the coating 120 may depend on several parameters that are correlated. The temperature of the coating 120 is lower than the temperature of the cool roof paint for a variety of different parameters as shown in FIGS. 3A-E.

Figure 3A:
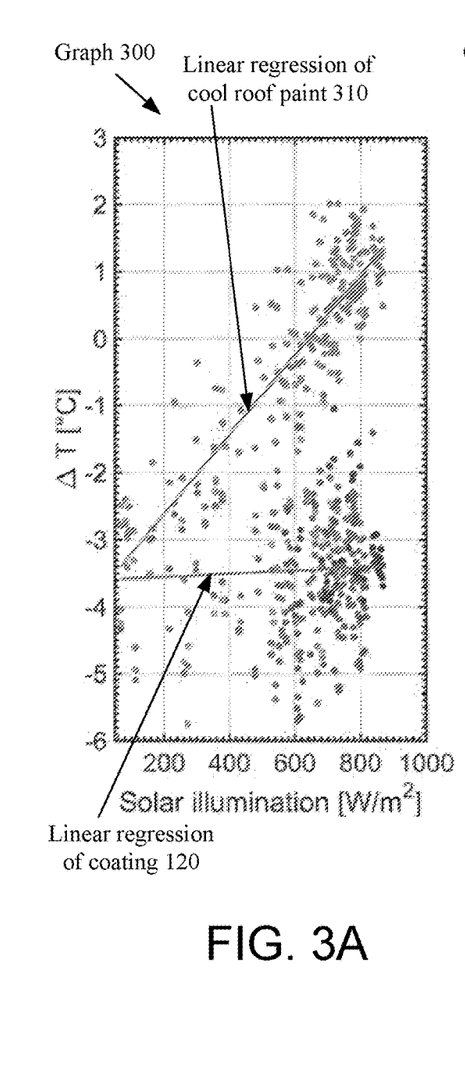
FIG. 3A is a graph illustrating linear regression of change of temperature of a cool roof paint and linear regression of change of temperature of a coating of a radiative cooling formulation at different values of solar illumination, in accordance with implementations of the present disclosure.

FIG. 3A is a graph 300 illustrating linear regression of change of temperature of cool roof paint 310 and linear regression of change of temperature of a coating 120 of a radiative cooling formulation at different values of solar illumination, in accordance with implementations of the present disclosure. The coating 120 has a linear regression of about 3.5° C. degrees below ambient temperature 222 at about 20 W/m² to about 3.3° C. degrees below ambient temperature 222 at about 800 W/m². The cool roof paint 310 has a linear regression of about 3.3° C. degrees below ambient temperature 222 at about 20 W/m² to about 1.2° C. degrees above ambient temperature 222 at about 800 W/m². As solar illumination increases, the temperature difference between the ambient temperature 222 and the temperature of the coating 120 stays substantially constant whereas as solar illumination increases, the temperature of the cool roof paint 310 rises and becomes greater than the ambient temperature 222.

Figure 3B:
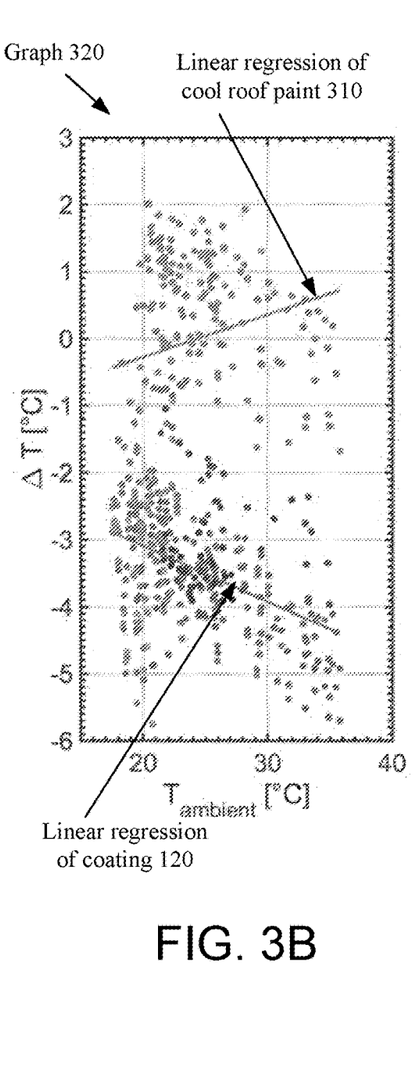
FIG. 3B is a graph illustrating linear regression of change of temperature of a cool roof paint and linear regression of change of temperature of a coating of a radiative cooling formulation at different values of ambient temperature, in accordance with implementations of the present disclosure.

FIG. 3B is a graph 320 illustrating linear regression of change of temperature of cool roof paint 310 and linear regression of change of temperature of a coating 120 of a radiative cooling formulation at different values of ambient temperature, in accordance with implementations of the present disclosure. The coating 120 has a linear regression of about 2.9° C. degrees below an ambient temperature 222 of about 18° C. to about 4.4° C. degrees below an ambient temperature 222 of about 36° C. The cool roof paint 310 has a linear regression of about 0.3° C. degrees below an ambient temperature 222 of about 18° C. to about 0.8° C. degrees above an ambient temperature 222 of about 36° C. As ambient temperature 222 increases, the temperature of the coating decreases whereas as ambient temperature 222 increases, the temperature of the cool roof paint 310 rises and becomes greater than the ambient temperature 222.

Figure 3C:
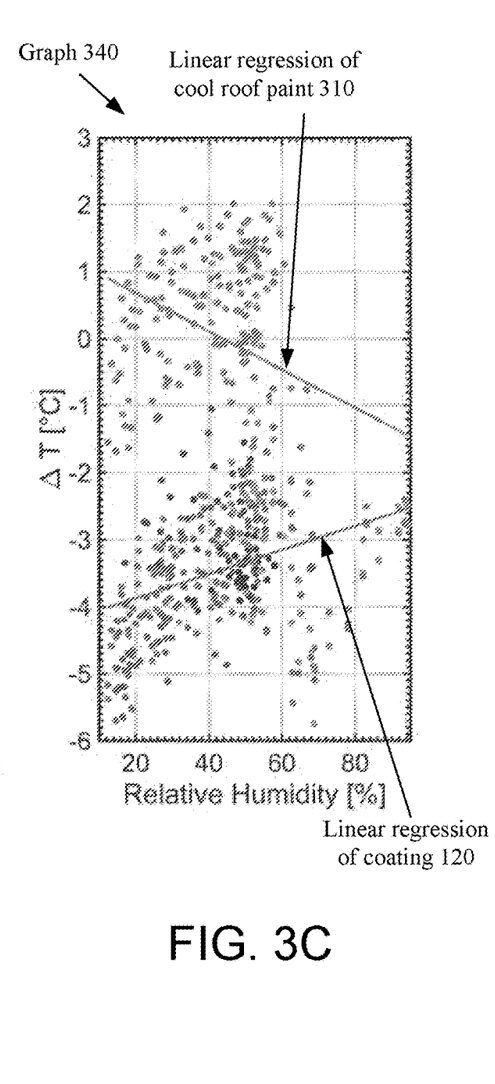
FIG. 3C is a graph illustrating linear regression of change of temperature of a cool roof paint and linear regression of change of temperature of a coating of a radiative cooling formulation at different values of relative humidity, in accordance with implementations of the present disclosure.

FIG. 3C is a graph 340 illustrating linear regression of change of temperature of cool roof paint 310 and linear regression of change of temperature of a coating 120 of a radiative cooling formulation at different values of relative humidity, in accordance with implementations of the present disclosure. The coating 120 has a linear regression of about 4.0° C. degrees below ambient temperature 222 at about 2% relative humidity to about 2.5° C. degrees below ambient temperature 222 at about 100% relative humidity. The cool roof paint 310 has a linear regression of about 0.8° C. degrees above ambient temperature 222 at about 2% relative humidity to about 1.4° C. degrees below ambient temperature 222 at about 100% relative humidity. The temperature of the coating 120 is lower (e.g., 1-5° C. lower) than the temperature of the cool roof paint 310 for all values of relative humidity shown in FIG. 3C.

Figure 3D:
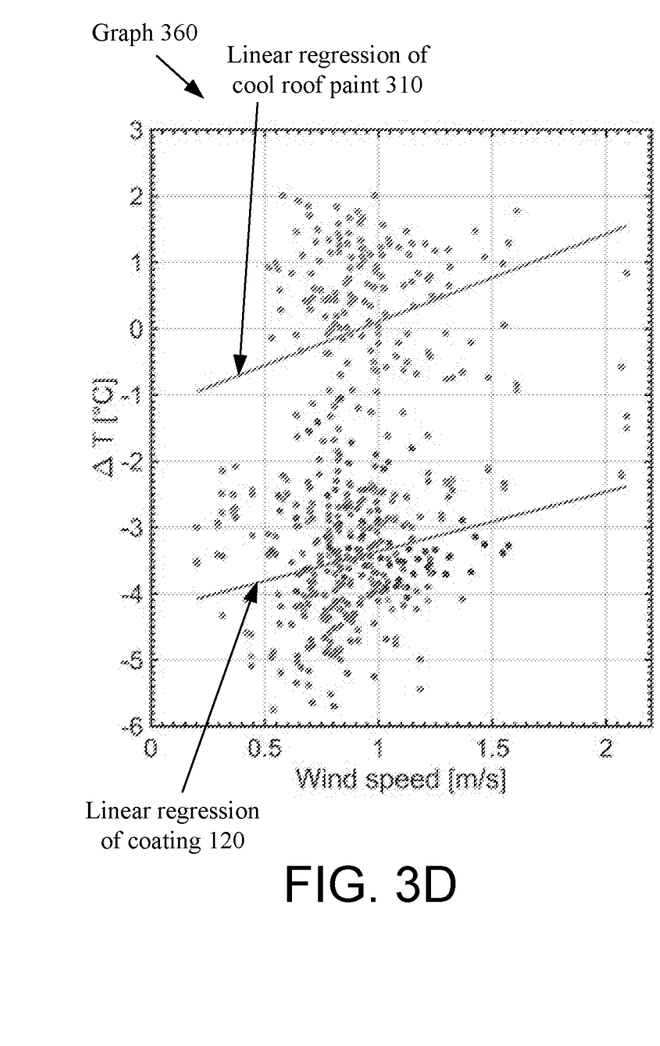
FIG. 3D is a graph illustrating linear regression of change of temperature of a cool roof paint and linear regression of change of temperature of a coating of a radiative cooling formulation at different values of wind speed, in accordance with implementations of the present disclosure.

FIG. 3D is a graph 360 illustrating linear regression of change of temperature of cool roof paint 310 and linear regression of change of temperature of a coating 120 of a radiative cooling formulation at different values of wind speed, in accordance with implementations of the present disclosure. The coating 120 has a linear regression of about 4.0° C. degrees below ambient temperature 222 at about 0.2 meters/second (m/s) wind speed to about 2.3° C. degrees below ambient temperature 222 at about 2.1 m/s wind speed. The cool roof paint 310 has a linear regression of about 0.9° C. degrees below ambient temperature 222 at about 0.2 m/s wind speed to about 1.6° C. degrees above ambient temperature 222 at about 2.1 m/s wind speed. The temperature of the coating 120 is lower (e.g., about 3.1-3.9° C. lower) than the temperature of the cool roof paint 310 for 0.2 to 2.1 m/s wind speed.

Figure 3E:
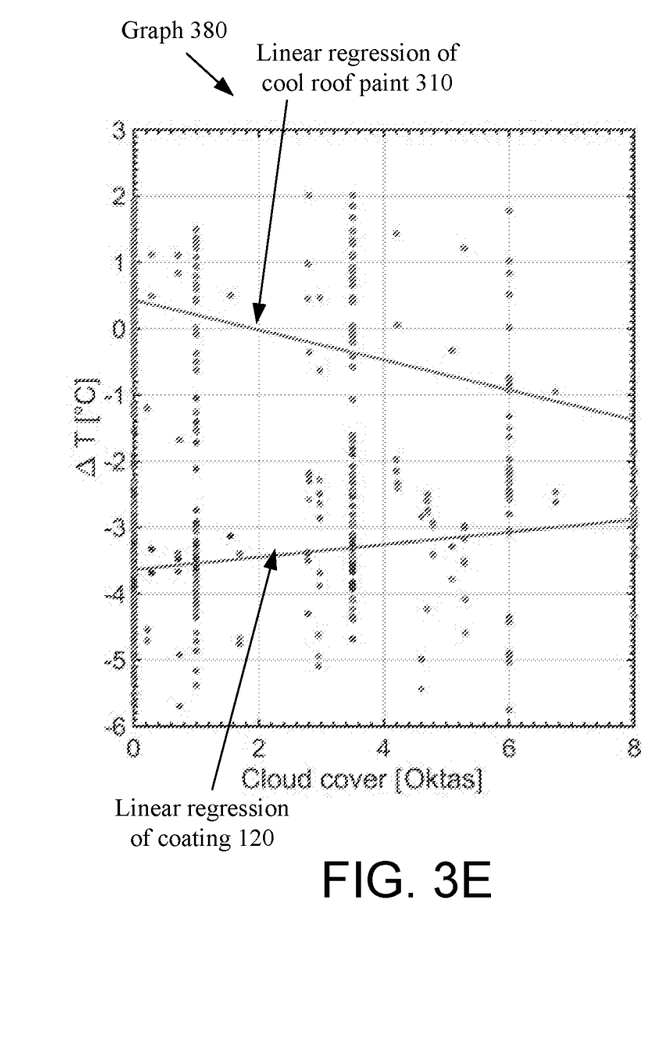
FIG. 3E is a graph illustrating linear regression of change of temperature of a cool roof paint and linear regression of change of temperature of a coating of a radiative cooling formulation at different values of cloud cover, in accordance with implementations of the present disclosure.

FIG. 3E is a graph 380 illustrating linear regression of change of temperature of cool roof paint 310 and linear regression of change of temperature of a coating 120 of a radiative cooling formulation at different values of cloud cover, in accordance with implementations of the present disclosure. The coating 120 has a linear regression of about 3.7° C. degrees below ambient temperature 222 at about 0 Oktas (e.g., completely clear sky per a weather station of the National Oceanic and Atmospheric Administration (NOAA)) to about 2.9° C. degrees below ambient temperature 222 at about 8 Oktas (e.g., the sky is completely covered in clouds per the weather station of the NOAA). The cool roof paint 310 has a linear regression of about 0.4° C. degrees above ambient temperature 222 at about 0 Oktas to about 1.3° C. degrees below ambient temperature 222 at about 8 Oktas. The temperature of the coating 120 is lower (e.g., about 1.6-4.1° C. lower) than the temperature of the cool roof paint 310 for 0-8 Oktas.

Figure 4A:
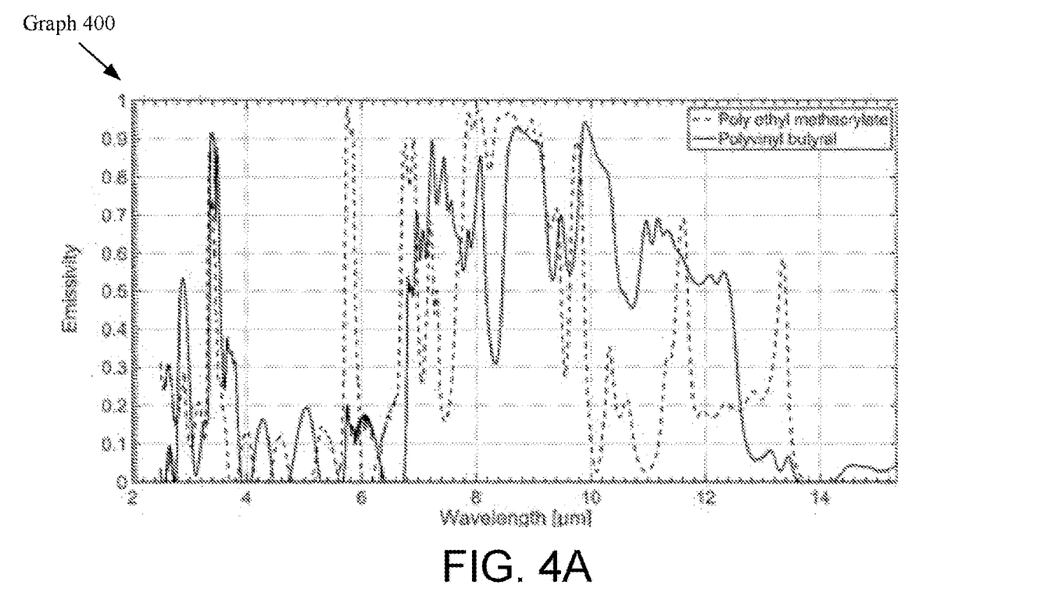
FIG. 4A is a graph illustrating emissivity at different wavelengths for poly ethyl methacrylate (PEMA) and polyvinyl butyral (PVB), in accordance with implementations of the present disclosure.

FIG. 4A is a graph 400 illustrating emissivity at different wavelengths for poly ethyl methacrylate (PEMA) and polyvinyl butyral (PVB), in accordance with implementations of the present disclosure. The radiative cooling formulation of coating 120 includes a binder that includes two or more polymers. In some implementations, the binder includes a first polymer that is PEMA and a second polymer that is PVB. PEMA and PVB are practically water insoluble and are substantially non-absorbing to light having wavelengths in the solar spectrum. PEMA and PVB have emissivity peak values greater than 0.85 at wavelengths between 4 and 35 µm. For example, PEMA has emissivity peak values of about 0.98 at about 5.8 µm, about 0.88 at about 6.8 µm, about 0.89 at about 6.9 µm, about 0.98 at about 7.9 µm, about 0.86 at about 8.4 µm, and about 0.88 at about 9.7 µm. PVB has emissivity peak values of about 0.92 at about 3.4 µm, about 0.90 at about 7.2 µm, and about 0.95 at about 9.8 µm. PEMA has emissivity peak values (e.g., at wavelengths of about 5.8 µm, 6.8 µm, 6.9 µm, 7.9 µm, 8.4 µm, and about 9.7 µm) that do not overlap with the emissivity peak values of PVB (e.g., at wavelengths of about 3.4 µm, 7.2 µm, and 9.8 µm). A net emissivity a coating 120 including a binder that includes PEMA and PVB is greater than a coating including a binder that includes only PEMA or PVB as shown in FIG. 4B.

Figure 4B:
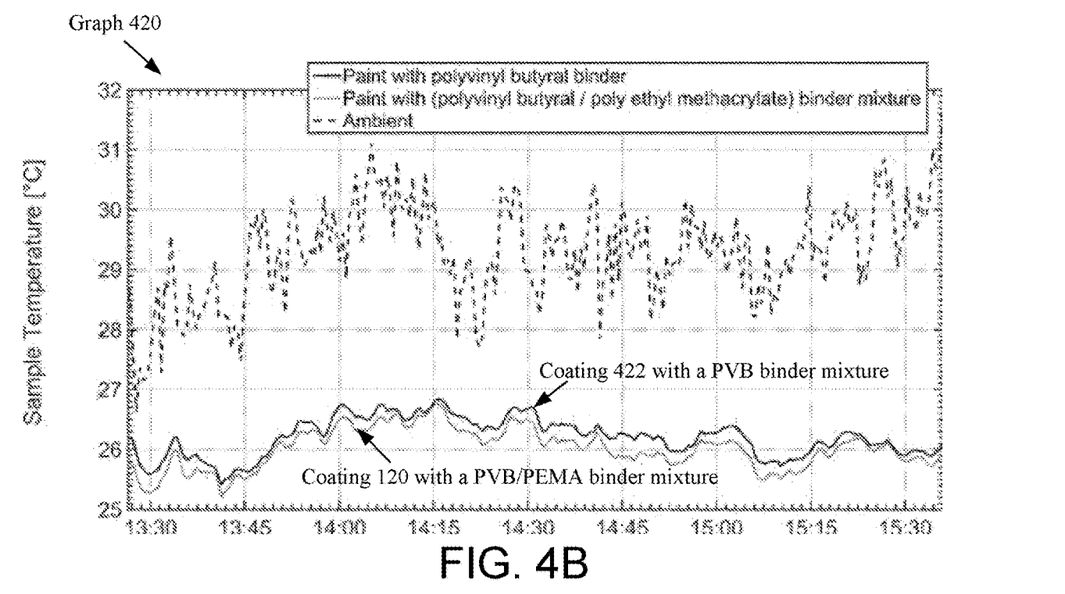
FIG. 4B is a graph illustrating temperature of a coating of a radiative cooling formulation including one polymer, temperature of a coating of a radiative cooling formulation including two polymers, and ambient temperature at different times of day, in accordance with implementations of the present disclosure.

FIG. 4B is a graph 420 illustrating temperature of a coating 422 including one polymer, temperature of a coating 120 of a radiative cooling formulation including two polymers, and ambient temperature at different times of day, in accordance with implementations of the present disclosure. In one implementation, a first object and a second object are aluminum plates (e.g., aluminum plates with substantially similar properties and dimensions). The coating 422 of the first object and the coating 120 of the second object may include BaSO$_4$. The first object is coated with a first radiative cooling formulation (e.g., passive radiative cooling paint) that contains a binder that includes only one polymer (e.g., only a PVB polymer, only a PVB binder) and the second object is coated with a second radiative cooling formulation (e.g., passive radiative cooling paint, coating 120) that includes both PVB and PEMA polymers in the binder (e.g., paint with a binder mixture of two or more polymers). The second object which is coated with a multi-polymer binder is about 0.1-0.4° C. cooler than the first object which is coated with a single-polymer binder. The sample temperatures shown in graph 300 may be for a summer day when the sun is at the zenith.

Figure 4C:
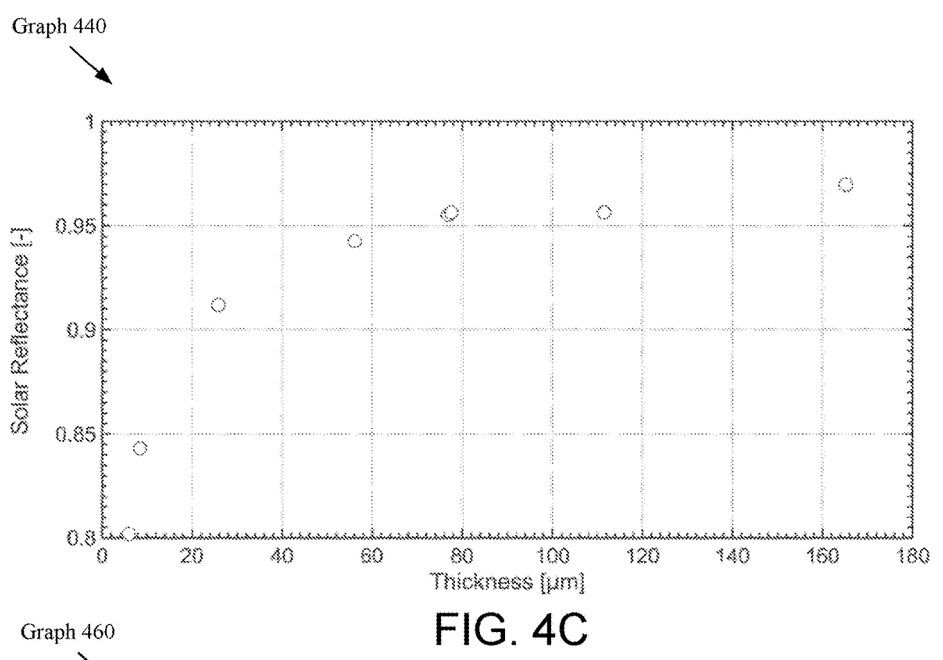
FIG. 4C is a graph illustrating solar reflectance of coatings of a radiative cooling formulation of different thicknesses, in accordance with implementations of the present disclosure.

FIG. 4C is a graph 440 illustrating solar reflectance of coatings 120 of a radiative cooling formulation of different thicknesses, in accordance with implementations of the present disclosure. In one implementation, the coating 120 has a thickness of at least 70 µm. In another implementation, the coating 120 in FIG. 4C has a thickness of about 70 µm. In some implementations, the coating 120 may have a solar reflectance of about 0.8 at a thickness of 6 µm, 0.84 at 8 µm, 0.9 at 26 µm, 0.94 at 56 µm, 0.88 from about 127 µm to about 145 µm, 0.89 from about 149 µm to about 195 µm, 0.91 from about 240 µm to about 250 µm, and about 0.915 at about 270 µm. In some implementations, the coating 120 has a solar reflectance of greater than 0.95 at thicknesses of 70 µm or greater. In some implementations, the BaSO$_4$ particles has a D50(volume) of 2 µm.

Figure 4D:
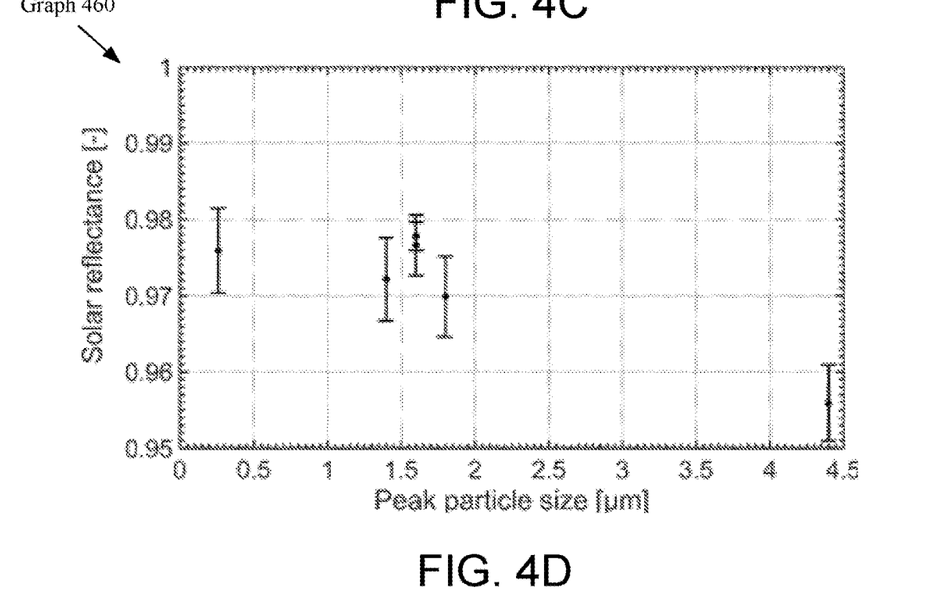
FIG. 4D is a graph illustrating solar reflectance of coatings of a radiative cooling formulation including solar reflector material of different particle sizes, in accordance with implementations of the present disclosure.

FIG. 4D is a graph 460 illustrating solar reflectance of coatings 120 of a radiative cooling formulation including solar reflector material of different particle sizes, in accordance with implementations of the present disclosure. The coating 120 includes a solar reflector material. In some implementations, the solar reflector material includes particles of BaSO$_4$. In some implementations, at least half of the particles of BaSO$_4$ in coating 120 are smaller than 2 µm. In some implementations, at least 75% of the particles of BaSO$_4$ in coating 120 are smaller than 2 µm. In some implementations, at least 90% of the particles of BaSO$_4$ in coating 120 are smaller than 2 µm. The particles may have dimensions smaller or equal to two times the wavelengths to be reflected in the solar radiation range to maximize the solar reflectance of the coating 120. The solar reflectance is about 0.970 to 0.982 at a peak particle size of about 0.2 µm, about 0.967 to 0.978 at a peak particle size of about 1.4 µm, about 0.964 to 0.975 at a peak particle size of about 1.8 µm, and about 0.951 to 0.961 at a peak particle size of about 4.4 µm. In some implementations, the particles are 0.2 µm or larger. In some implementations, the particles are 0.1 or larger. In some implementations, the particles are no larger than 5 µm.

Figure 5A:
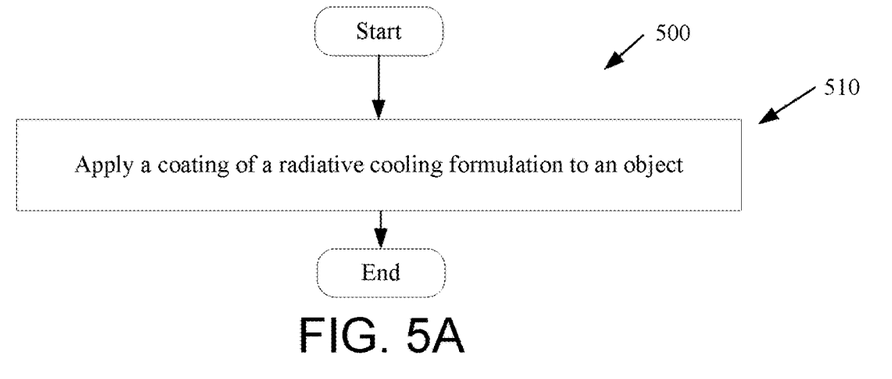
FIG. 5A is a flow diagram illustrating a method of applying a coating of a radiative cooling formulation to an object, in accordance with implementations of the present disclosure.

FIG. 5A is a flow diagram illustrating a method 500 of applying a coating 120 of a radiative cooling formulation to an object, in accordance with implementations of the present disclosure.

At block 510, a coating 120 of a radiative cooling formulation is applied to an object. In certain implementations, the object comprises at least one of aluminum, steel, carbon fiber resin, roof tent, flexible tarp, or surface of an automobile. In one implementation, the coating 120 is brushed on the object. In another implementation, the coating 120 is sprayed on the object. In another implementation, the coating 120 is rolled on the object. In another implementation, the coating 120 is applied to the object by dipping (e.g., dipping at least a portion of the object in a radiative cooling formulation). In another implementation, the coating 120 is doctor bladed (e.g., knife coated, blade coated) on the object (e.g., radiative cooling formulation is placed on a surface of the object and at least one of a blade or the object move relative to each other so that the blade controls the thickness of the coating 120 on the object via a gap size between the blade and the surface of the object). In another implementation, the coating is applied to the object by another painting technology. The radiative cooling formulation includes a binder and a solar reflector material embedded in the binder. The binder includes at least two polymers that are practically water insoluble and are substantially non-absorbing to light having wavelengths in a solar spectrum.

Figure 5B:
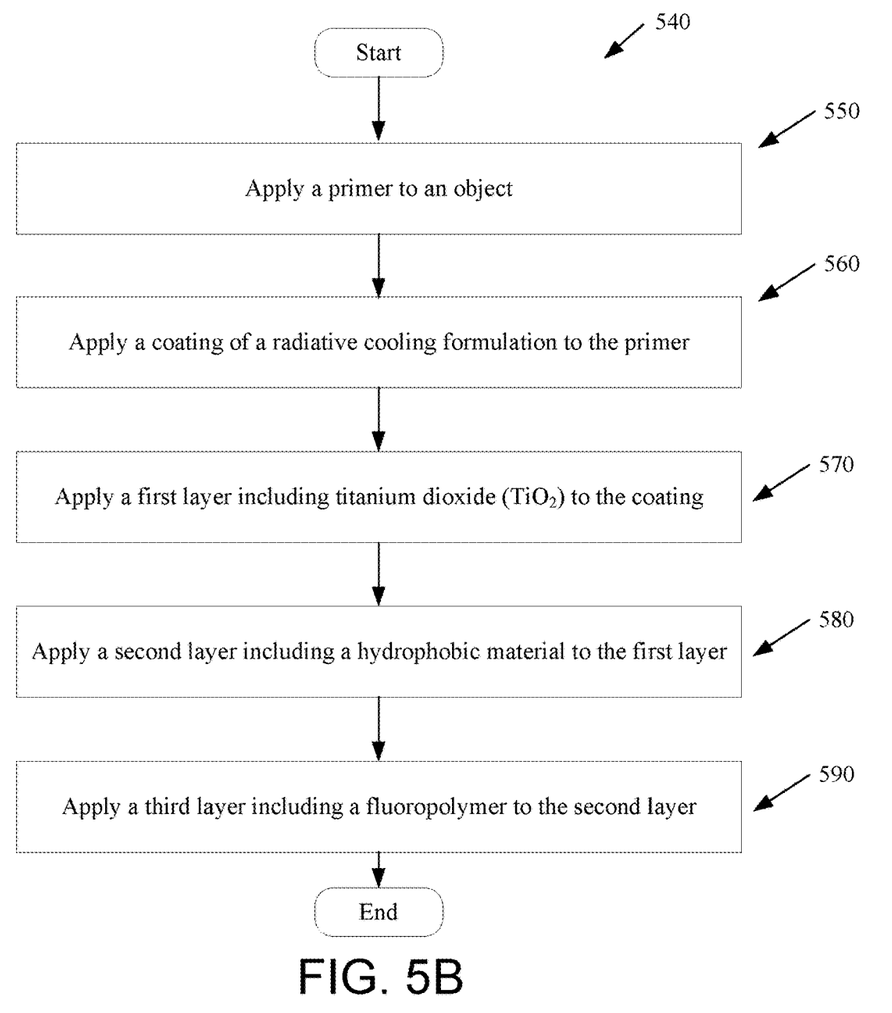
FIG. 5B is a flow diagram illustrating a method of applying a coating of a radiative cooling formulation to an object and one or more layers on the coating, in accordance with implementations of the present disclosure.

FIG. 5B is a flow diagram illustrating a method 540 of applying a coating 120 of a radiative cooling formulation to an object and one or more layers (e.g., first layer 130, second layer 140, third layer 150, etc.) on the coating 120, in accordance with implementations of the present disclosure.

At block 550, a primer (e.g., primer layer) is applied to an object. In one implementation, the primer is for adhesion (e.g., improves adhesion between the object and the coating 120). In another implementation, the primer is for corrosion resistance (e.g., prevents corrosion of the object (e.g., a metal object)).

At block 560, a coating 120 of a radiative cooling formulation is applied to the primer (e.g., on the primer, on the object). Block 560 may be similar to block 510 of FIG. 5A.

At block 570, a first layer 130 including TiO$_2$ is applied to the coating 120 (e.g., on the primer, on the object, on the coating 120). The first layer 130 may be applied by one or more of brushing, spraying, rolling, dipping, doctor blading a paint, or another painting technology.

At block 580, a second layer 140 including a hydrophobic material is applied to the first layer 130 (e.g., on the primer, on the object, on the coating 120, on the first layer 130). In one implementation, the first layer 130 includes a hydrophobic material and the second layer 140 includes TiO$_2$. The second layer 140 may be applied by one or more of brushing, spraying, rolling, dipping, doctor blading a paint, or another painting technology.

At block 590, a third layer 150 including fluoropolymer (e.g., PTFE, PFA, FEP, ETFE, THV, etc.) is applied to the second layer 140 (e.g., on the primer, on the object, on the coating 120, on the first layer 130, on the second layer 140). The third layer 150 may be applied by one or more of brushing, spraying, rolling, dipping, doctor blading a paint, or another painting technology. In certain implementations, the third layer is applied by laminating the third layer on the second layer 140.

In one implementation, one or more of the first layer 130, second layer 140, and third layer 150 are mixed together. In another implementation, one or more of the first layer 130, second layer 140, and third layer 150 are mixed in with the coating 120 of a radiative cooling formulation. In another implementation, one or more of the first layer 130, second layer 140, and third layer 150 is omitted (e.g., the second layer 140 is on the coating 120, the third layer 150 is on the coating 120, etc.). In another implementation, one or more of the coating 120, first layer 130, second layer 140, and third layer 150 is on the object (e.g., substrate 110) in a different order that the order illustrated in FIG. 5B.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Although implementations of the disclosure were discussed in the context of applying a coating 120 to an object, one or more of the components or materials described herein may be utilized in other passive radiation cooling systems. Thus, implementations of the disclosure are not limited to a coating on an object.

In the foregoing description, numerous details were set forth. It will be apparent, however, to one of ordinary skill in the art having the benefit of this disclosure, that the implementations of the present disclosure may be practiced without these specific details. In some instances, certain structures and devices are shown in block diagram form, rather than in detail, in order to avoid obscuring the present disclosure. It is to be understood that the details of such structures and devices, as well as various processes for producing the same, would be within the purview of one of ordinary skill in the art.

The terms "above," "under," "between," and "on" as used herein refer to a relative position of one layer with respect to other layers. As such, for example, one layer deposited or disposed above or under another layer may be directly in contact with the other layer or may have one or more intervening layers. Moreover, one layer deposited or disposed between layers may be directly in contact with the layers or may have one or more intervening layers. In contrast, a first layer "on" or deposited "onto" a second layer is in contact with that second layer. Additionally, the relative position of one layer with respect to other layers is provided assuming the initial disk is a starting substrate and the subsequent processing deposits, modifies and removes films from the substrate without consideration of the absolute orientation of the substrate. Thus, a film that is deposited on both sides of a substrate is "over" both sides of the substrate.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

The present disclosure is not to be limited in scope by the specific implementations described herein. Indeed, other various implementations of and modifications to the present disclosure pertaining to laser devices, in addition to those described herein, will be apparent to those of ordinary skill in the art from the preceding description and accompanying drawings. Thus, such other implementations and modifications pertaining to laser devices are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
a radiative cooling formulation comprising:
a first component with >55% reflectance in a wavelengths range of 0.3 to 2.5 microns;
a second component with a first thermal emissivity peak value greater than 0.85 at a first wavelength in a range of 8 to 13 microns (μm); and
a third component to mechanically bind together a mixture of the first component and second component.

2. The apparatus of claim 1, wherein the second component has a second thermal emissivity peak value greater than 0.85 at a second wavelength in the range of 8 to 13 μm.

3. The apparatus of claim 1, further comprising a substrate, wherein radiative cooling formulation is disposed on the substrate in the form of a coating.

4. The apparatus of claim 3, wherein the coating has a thickness of at least 70 μm.

5. The apparatus of claim 3 wherein the coat has a thickness of at least 1 millimeter.

6. The apparatus of claim 3, wherein the coating has a thickness of about 6 μm.

7. The apparatus of claim 3, wherein the radiative cooling formulation is disposed on the substrate in the form of the coating by one of being sprayed, brushed, rolled, dipped, or doctor bladed.

8. The apparatus of claim 1, wherein the radiative cooling formulation further comprises an ultraviolet absorber additive.

9. The apparatus of claim 8, wherein the ultraviolet absorber additive absorbs ultraviolet radiation in wavelengths less than 400 nanometers (nm).

10. The apparatus of claim 8, wherein the ultraviolet absorber additive comprises at least one of hydroxybenzophenone and hydroxyphenylbenzotriazole, titanium dioxide, benzotriazoles and hydroxyphenyltriazines.

11. The apparatus of claim 1, wherein the radiative cooling formulation comprises less than about 1% by volume of $TiO_2$, 70 to 94% by volume of $BaSO_4$, and 6-30% by volume binders.

12. The apparatus of claim 1, further comprising a primer, wherein radiative cooling formulation is disposed on the primer.

13. The apparatus of claim 1, wherein the first component has >95% reflectance in the wavelengths range of 0.3 to 2.5 microns.

14. The apparatus of claim 3, wherein the coating has a thickness of at least 200 μm.

\* \* \* \* \*